United States Patent
Kim et al.

(10) Patent No.: US 8,416,784 B2
(45) Date of Patent: Apr. 9, 2013

(54) APPARATUS AND METHOD FOR RECEIVING PACKET DATA IN WIRELESS COMMUNICATION SYSTEM

(75) Inventors: Soeng-Hun Kim, Suwon-si (KR); Gert Jan Van Lieshout, Apeldoorn (NL)

(73) Assignee: Samsung Electronics Co., Ltd., Suwon-si (KR)

( * ) Notice: Subject to any disclaimer, the term of this patent is extended or adjusted under 35 U.S.C. 154(b) by 419 days.

(21) Appl. No.: 12/553,512

(22) Filed: Sep. 3, 2009

(65) Prior Publication Data
US 2011/0051664 A1  Mar. 3, 2011

(51) Int. Cl.
*H04W 4/00* (2009.01)
(52) U.S. Cl. .......................... 370/394; 370/328; 714/746
(58) Field of Classification Search .................. None
See application file for complete search history.

(56) References Cited

U.S. PATENT DOCUMENTS

| | | | |
|---|---|---|---|
| 6,038,232 A | 3/2000 | Jung et al. | |
| 6,697,331 B1* | 2/2004 | Riihinen et al. | 370/236 |
| 7,403,528 B2* | 7/2008 | Hu et al. | 370/394 |
| 7,957,389 B2* | 6/2011 | Hu | 370/394 |
| 8,050,178 B2* | 11/2011 | Yi et al. | 370/235 |
| 2002/0080792 A1* | 6/2002 | Rosier | 370/394 |
| 2003/0128705 A1* | 7/2003 | Yi et al. | 370/394 |
| 2003/0169741 A1* | 9/2003 | Torsner et al. | 370/394 |
| 2004/0052250 A1* | 3/2004 | Hu et al. | 370/389 |
| 2005/0022098 A1* | 1/2005 | Vayanos et al. | 714/776 |
| 2005/0220032 A1* | 10/2005 | Hu | 370/244 |
| 2005/0270996 A1 | 12/2005 | Yi et al. | |
| 2007/0195826 A1* | 8/2007 | Wang et al. | 370/498 |
| 2010/0136995 A1* | 6/2010 | Yi et al. | 455/452.1 |

FOREIGN PATENT DOCUMENTS

| | | |
|---|---|---|
| KR | 10-2006-0090191 A | 8/2006 |
| KR | 10-2008-0111396 A | 12/2008 |
| WO | 2006/083149 A1 | 8/2006 |
| WO | 2008/156301 A3 | 12/2008 |

\* cited by examiner

*Primary Examiner* — Bob Phunkulh
(74) *Attorney, Agent, or Firm* — Jefferson IP Law LLP (57) ABSTRACT

An apparatus and method for simultaneously receiving a plurality of Packet Data Units (PDUs) are provided. In a method of receiving a plurality of PDUs, the plurality of PDUs, each PDU having an associated Sequence Number (SN), are received, one of the plurality of PDUs is input into a reception buffer, a first variable is updated based on the SN of the PDU input into the reception buffer, wherein the first variable indicates the highest SN of PDUs input into the reception buffer, a determination is made if a timer is running, if the timer is not running, a determination is made if all of the received PDUs are input into the reception buffer, and, if any of the received PDUs is not input into the reception buffer, a next PDU to be input into the reception buffer is awaited.

23 Claims, 9 Drawing Sheets

APPARATUS AND METHOD FOR RECEIVING PACKET DATA IN WIRELESS COMMUNICATION SYSTEM

BACKGROUND OF THE INVENTION

1. Field of the Invention

The present invention relates to an apparatus and method for receiving Protocol Data Units (PDUs). More particularly, the present invention relates to an apparatus and method for simultaneously receiving a plurality of PDUs.

2. Description of the Related Art

With the advance of mobile communication technology, portable terminals are now able to provide users with voice communication services as well as the ability to transmit and receive data. As users become more sophisticated and more demands are made for enhanced services, service providers are considering new ways to provide data communication at higher speeds.

The $3^{rd}$ Generation Partnership Project (3GPP) is currently standardizing a technology known as Long Term Evolution (LTE) to provide higher speed data communication. LTE is a broadband packet-based communication technology which is expected to be commercially available in 2010 and provide downlink data communication speeds of up to 100 Mbps. To achieve such high speed data rates, an LTE system minimizes the number of involved nodes in the connection.

In the provision of a data service, resources are allocated after considering the amount of data to be transmitted and the status of the channel. Accordingly, a wireless communication system is provided with a scheduler to manage the resource allocation in consideration of the available resources, channel status, quantity of transmission data, and the like. Such resource scheduling is required in LTE as one of the next generation mobile communication systems, and a scheduler incorporated in a base station is responsible for management of radio transmission resources.

In an LTE system, data is transmitted in a unit of Transport Block (TB) or Media Access Control Protocol Data Unit (MAC PDU) with a Transmission Time Interval (TTI) of 1 msec. Typically, a single MAC PDU is transmitted in a single TTI and the protocol layers of LTE have been designed under this assumption. However, as the LTE standards have evolved, there have been discussions regarding the use of multiple downlink and uplink channels for a User Equipment (UE) to receive and transmit data. In such an evolved communication environment, a UE can transmit and receive multiple MAC PDUs and thus multiple Radio Link Control (RLC) PDUs can be received on a logical channel. Accordingly, there is a need to develop a method and device that can operate appropriately for receiving a plurality of RLC PDUs simultaneously.

SUMMARY OF THE INVENTION

An aspect of the present invention is to address at least the above-mentioned problems and/or disadvantages and to provide at least the advantages described below. Accordingly, an aspect of the present invention is to provide an apparatus and method for simultaneously receiving a plurality of Protocol Data Units (PDUs) in a wireless communication system.

In accordance with an aspect of the present invention, a method for receiving a plurality of PDUs is provided. The method includes receiving a plurality of PDUs, inputting one of the plurality of PDUs into a reception buffer, determining if a PDU is missing in the reception buffer, and starting a timer if a PDU is determined missing in the reception buffer, wherein the timer is run once for all missing PDUs.

In accordance with another aspect of the present invention, a method for receiving a plurality of PDUs is provided. The method includes receiving a plurality of PDUs, inputting one of the plurality of PDUs into a reception buffer, determining if a PDU is missing in the reception buffer, and starting a timer if a PDU is determined missing in the reception buffer, wherein the timer is run for all missing PDUs and is restarted if another PDU is determined missing while the timer is running In accordance with another aspect of the present invention, an apparatus for receiving a plurality of PDUs is provided. The apparatus includes a demultiplexer for demultiplexing a bit stream into a plurality of PDUs, and a PDU receiving device for receiving the plurality of PDUs from the demultiplexer, for inputting one of the plurality of PDUs into a reception buffer, for determining if a PDU is missing in the reception buffer, and for starting a timer if a PDU is determined missing in the reception buffer, wherein the timer is run once for all missing PDUs In accordance with still another aspect of the present invention, an apparatus for receiving a plurality of PDUs is provided. The apparatus includes a demultiplexer for demultiplexing a bit stream into a plurality of PDUs, and a PDU receiving device for receiving the plurality of PDUs, for inputting one of the plurality of PDUs into a reception buffer, for determining if a PDU is missing in the reception buffer, and for starting a timer if a PDU is determined missing in the reception buffer, wherein the timer is run for all missing PDUs and is restarted if another PDU is determined missing while the timer is running.

Other aspects, advantages, and salient features of the invention will become apparent to those skilled in the art from the following description, which, taken in conjunction with the annexed drawings, discloses exemplar embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It should be understood that the following description refers to terms utilized in the Long Term Evolution (LTE) and LTE-Advanced (LTE-A) standards merely for simplicity of explanation. However, this description should not be interpreted as limiting the present invention to use in a system employing only the LTE or LTE-A standard.

As described below, exemplary embodiments of the present invention provide an apparatus and method for receiving multiple data packets simultaneously and, when a plurality of data packets are determined as missing, reordering the missing packets.

Figure 1:
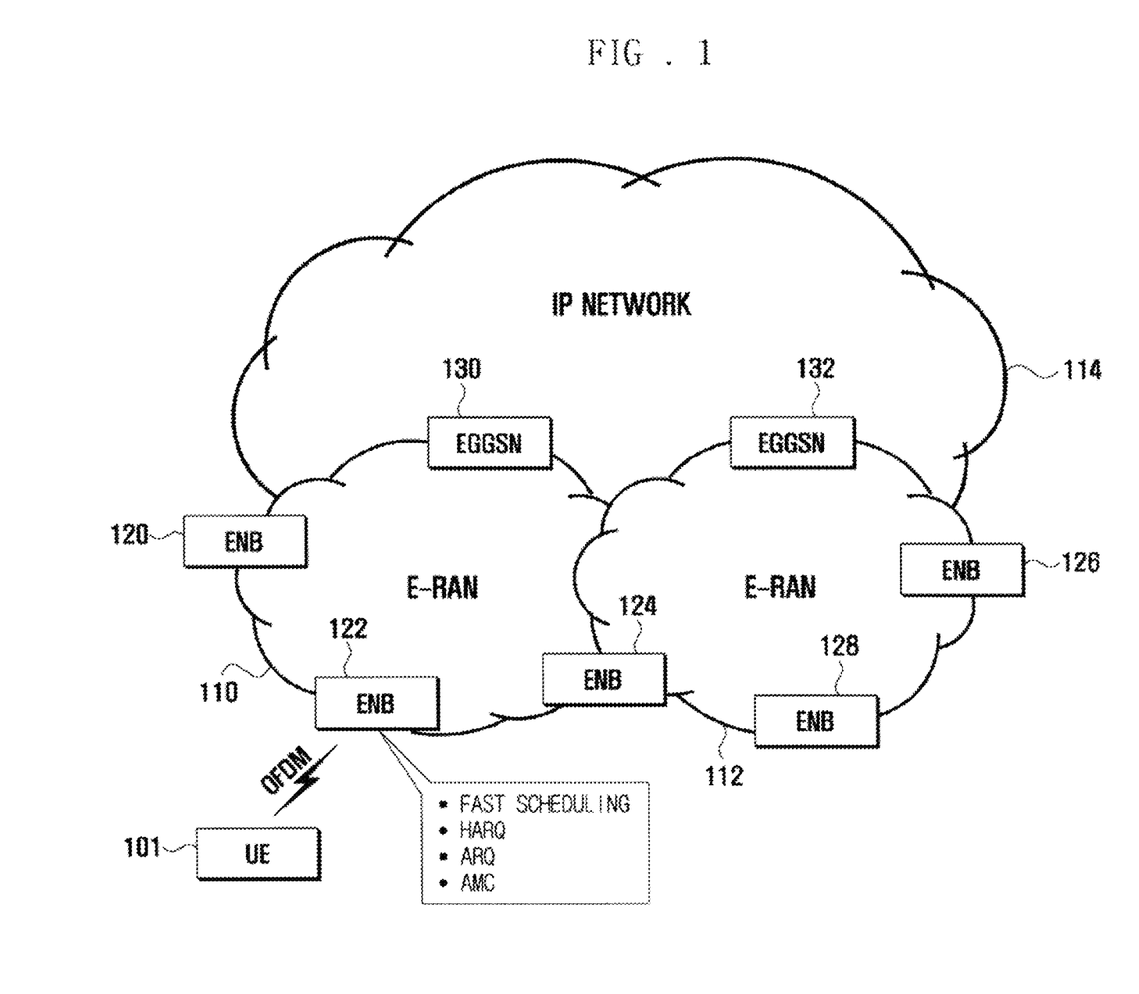
FIG. 1 is a schematic diagram illustrating a Long Term Evolution (LTE) wireless communication system according to an exemplary embodiment of the present invention.

FIG. 1 is a schematic diagram illustrating a LTE wireless communication system according to an exemplary embodiment of the present invention.

Referring to FIG. 1, an LTE wireless mobile communication system includes a User Equipment (UE) 101, a first evolved Radio Access Network (e-RAN) 110, a second e-RAN 112, an Internet Protocol (IP) network 114, a first evolved Node B (eNB) 120, a second eNB 122, a third eNB 124, a fourth eNB 126 and a fifth eNB 128, a first enhanced Gateway GPRS Support Node (eGGSN) 130, and a second eGGSN 132. Of course, while certain numbers of each structure are illustrated (e.g. one UE, five eNBs, etc.), it is to be understood that this is merely for convenience of explanation and not to be construed as limiting.

The UE 101 provides a user with voice and/or data communication service by accessing the IP network 114 via the eNB 122 and the e-RAN 110. To achieve a download speed of 100 Mbps or faster, the LTE communication system according to an exemplary implementation uses Orthogonal Frequency Division Multiplexing (OFDM) technology on a 20 MHz bandwidth. Also, the LTE communication system according to an exemplary implementation uses an Adaptive Modulation and Coding (AMC) scheme for determining a modulation scheme and a channel coding rate according to a channel status of the UE 101. The UE 101 may include any mobile communication terminal including a mobile phone, a laptop computer, a palmtop, a Personal Digital Assistant (PDA) and the like. As will be explained in more detail with reference to FIG. 2 below, the UE 101 includes a user plane protocol stack for LTE communication.

In the illustrated embodiment, the first e-RAN 110 includes the first eNB 120, the second eNB 122, the third eNB 124, and the first eGGSN 130 while the second e-RAN 112 includes the third eNB 124 (shared with the first eRAN 110), the fourth eNB 126, the fifth eNB 128, and the second eGGSN 132. This configuration is based on the LTE communication system design in which an e-RAN includes only an eNB and an eGGSN as its two infrastructure nodes. The eNB of the LTE communication system corresponds to the Node B of the Universal Mobile Telecommunications System (UMTS) system but provides more complex functions. More particularly, in the next generation wireless communication system, all user traffic being used for a real time service such as Voice over IP (VoIP) is provided through a shared channel. For this reason, there is a need for a device that collects status information of the UEs and schedules service based on the status information. Accordingly, each of the eNBs is responsible for collecting status information and scheduling the UEs associated therewith.

Figure 2:
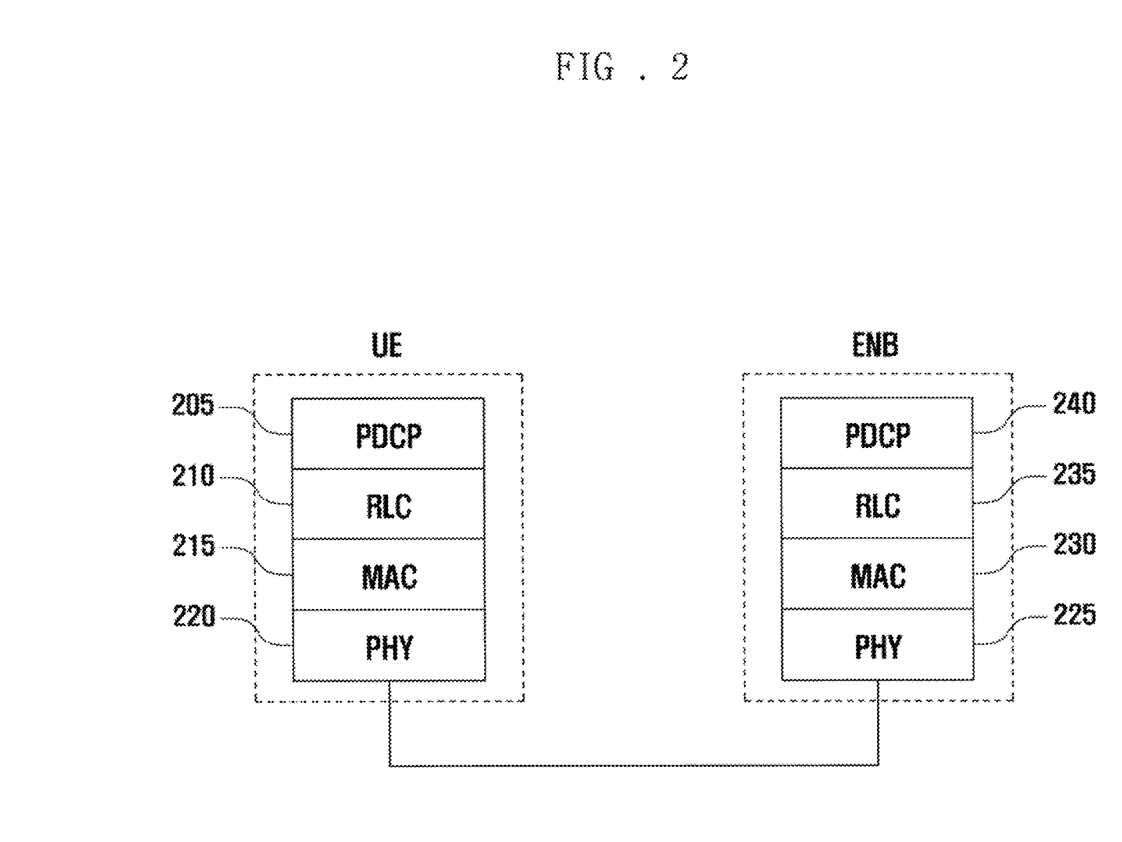
FIG. 2 is a diagram illustrating a user plane protocol stack architecture of an LTE mobile communication system according to an exemplary embodiment of the present invention.

FIG. 2 is a diagram illustrating a user plane protocol stack architecture of an LTE mobile communication system according to an exemplary embodiment of the present invention.

Referring to FIG. 2, the UE has a user plane protocol stack layer that includes a Packet Data Convergence Protocol (PDCP) layer 205, a Radio Link Control (RLC) layer 210, a Media Access Control (MAC) layer 215, and a Physical (PHY) layer 220. Similarly, the eNB has a user plane protocol stack that includes a PDCP layer 240, an RLC layer 235, a MAC layer 230, and a PHY layer 225. The PDCP layers 205 and 240 are responsible for IP header compression/decompression. The RLC layers 210 and 235 pack PDCP or other upper layer Protocol Data Units (PDUs) into a size that is appropriate for transmission and perform Automatic Repeat reQuest (ARQ) functions. The MAC layers 215 and 230 serve multiple RLC layer entities, multiplex RLC PDUs into a MAC PDU and de-multiplex MAC PDUs into an RLC PDU. The PHY layers 220 and 225 perform encoding and modulation on upper layer data for transmission through a radio channel and perform demodulation and decoding on OFDM symbols received through a radio channel for delivery to upper layers.

In an LTE mobile communication system, a Service Data Unit (SDU), which includes data for transmission, is input into a protocol entity. The SDU is segmented and output by the protocol entity as a Protocol Data Unit (PDU) for transmission between peer RLC entities. More particularly, an RLC entity of a transmitting unit (e.g. RLC entity of a transmitting eNB) forms RLC data PDUs from the RLC SDUs delivered from an upper layer and transmits the RLC PDUs via the lower MAC layer. Each RLC PDU includes an RLC header carrying a PDU Sequence Number (SN) which allows the peer RLC receiving entity to recover the associated RLC SDUs from the received and properly ordered RLC PDUs. That is, an RLC entity of the receiving unit (e.g. RLC entity of a receiving UE) establishes a receiving window, uses the SNs to reorder the RLC PDUs delivered from the lower MAC layer and determines whether there are missing RLC PDUs. The receiving entity reconfigures the RLC SDUs from the received RLC PDUs and delivers the reconfigured RLC SDUs to an upper layer. Also, if the RLC receiving entity determines that an RLC PDU is missing, the RLC receiving entity requests the peer RLC transmitting entity to retransmit the missing RLC PDUs.

To accomplish the above transmission and reception of the RLC PDUs, the LTE communication system utilizes several state variables and timers which will be explained in more detail below.

Figure 3:
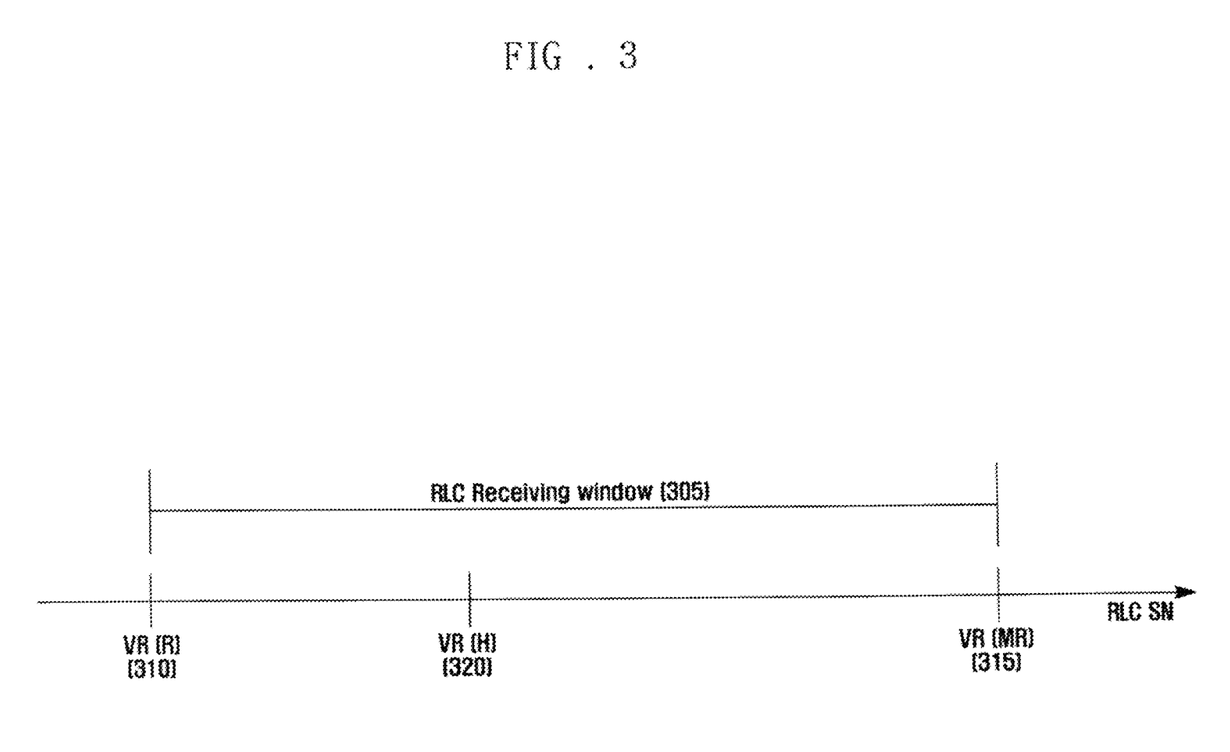
FIG. 3 illustrates a conventional receiving window and associated variables in an LTE wireless communication system.
Figure 4:
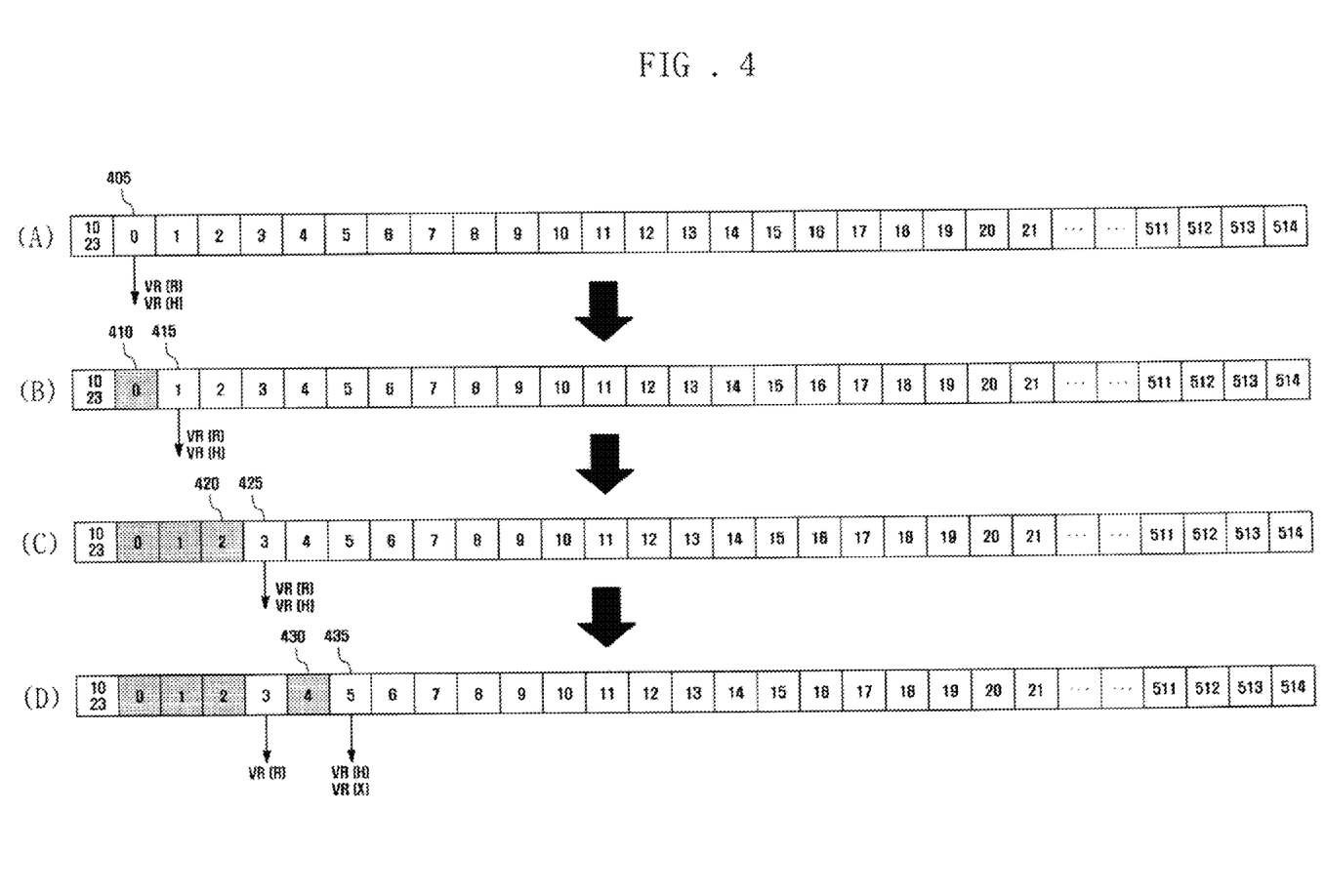
FIG. 4 illustrates a conventional Radio Link Control (RLC) handling operation of an RLC receiving entity in an LTE wireless communication system.
Figure 5:
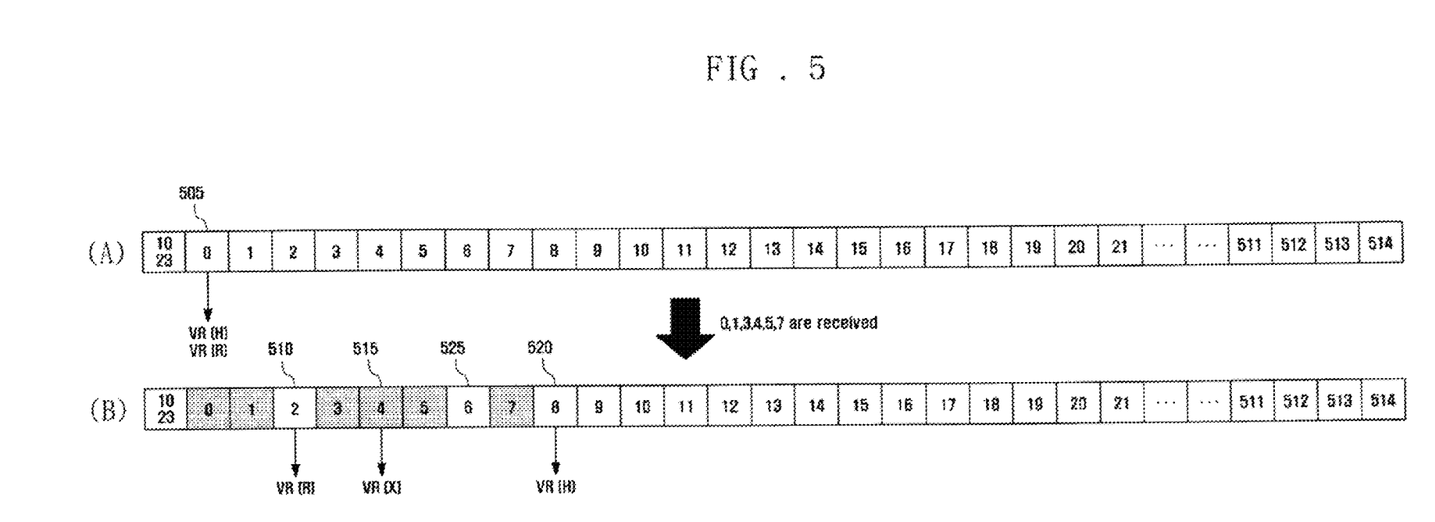
FIG. 5 illustrates an RLC handling operation of a conventional RLC receiving entity in an LTE wireless communication system receiving a plurality of Protocol Data Units (PDUs) simultaneously.

FIG. 3 illustrates a conventional receiving window and associated variables in an LTE communication system. FIG. 4 illustrates a conventional RLC handling operation of an RLC receiving entity in an LTE wireless communication system. FIG. 5 illustrates an RLC handling operation of a conventional RLC receiving entity in an LTE wireless communication system receiving a plurality of PDUs simultaneously.

Referring to FIG. 3, an RLC receiving window 305 is used by an RLC receiving entity during reception of RLC PDUs. The receiving window 305 indicates RLC PDUs not yet received and has a constant size defined as AM_Window_Size that is known by both the transmitting and receiving RLC peer entities. In the LTE wireless communication system, the receiving window 305 is set at a half cycle of the RLC SNs. Since a 10 bit SN is used for the RLC PDU, the receiving window size is 512.

The receiving window 305 has a width established at a first end by a variable VR(R) 310 and at a second end by a variable VR(MR) 315. More particularly and with reference to Table 1, the variable VR(R) 310 indicates the SN following the last in sequence and completely received PDU. As also shown in Table 1, the variable VR(MR) indicates the SN of the first PDU that is beyond the receiving window. The variable VR(H) 320 indicates the value of the SN following the SN of the RLC PDU with the highest SN among received RLC PDUs. Although not illustrated in FIG. 3, the variable VR(X) indicates the SN following the SN of an RLC PDU that triggered a timer denoted as the t_Reordering timer. The variable VR(X) and operation the t_Reordering timer are used in case an RLC PDU is missing and their function will be explained in more detail below. Table 1 provides additional information about the variables and timer. The variables and timer shown in Table 1 and used in the present disclosure are defined in the 3GPP Technical Specification (TS) 36.322 v8.5.0, which is hereby incorporated by reference.

TABLE 1

| | |
|---|---|
| VR (R) | Receive State Variable - Holds the value of the SN following the last in sequence completely received RLC PDU and serves as the lower edge of the receiving window. It is initially set to zero and updated whenever the RLC receiving entity receives an RLC PDU with SN = VR(R). |
| VR (H) | Highest Received State Variable - Holds the value of the SN following the SN of the RLC PDU with the highest SN among received RLC PDUs. It is initially set to zero. |
| VR (MR) | Maximum Acceptable Receive State Variable - Equal to VR(R) + AM_Window_Size. Holds the value of the SN of the first RLC PDU that is beyond the receiving window and serves as the higher edge of the receiving window. |
| VR (X) | t_Reordering State Variable - Holds the value of SN following the SN of the RLC PDU that triggered the t_Reordering timer. |
| t_Reordering timer | Used by a receiving side RLC entity to detect loss of RLC PDUs at a lower layer. If the t_Reordering timer is running, another t_Reordering timer shall not be started additionally (i.e. only one t_Reordering timer per RLC entity is running at a given time). |

Like other SNs used in the protocol, the SNs of RLC PDUs increase monotonically from zero to a maximum value and then return to zero, repeatedly reusing all of the SNs. Accordingly, in the following description, any comparison of a first RLC PDU [x] being higher than another RLC PDU [y] merely indicates that the RLC PDU [x] follows the RLC PDU [y] from the cyclic view of the RLC PDU SNs rather than that the RLC PDU [x] is greater than the RLC PDU [y] regarding an arithmetic consideration.

During reception of RLC PDUs from a peer transmitting entity, the RLC receiving entity considers only the received RLC PDUs having an SN that falls within the range of the receiving window 305. In a situation where the SN of a received RLC PDU falls outside the RLC receiving window 305, the RLC receiving entity determines that the RLC PDU is a duplicate or an erroneous RLC PDU and discards the RLC PDU.

On the other hand, if the received PDU falls within the receiving window 305, the receiving entity determines if the PDU only contains information previously received, in which case the PDU is discarded. If the PDU contains information not previously received, the receiving entity inputs the received PDU into a reception buffer for reassembly into a corresponding RLC SDU and delivers the reassembled RLC SDU to an upper layer. When the RLC PDU is input into the reception buffer, the receiving entity considers the various state variables and timer to determine a next operation. For example, the receiving entity updates the variable VR(R) to the SN following the highest SN of the RLC PDU delivered to the upper layer. The variable VR(H) is updated to the SN following the highest SN of the received PDUs. Generally, if RLC PDUs are received in sequence, the variables VR(R) and VR(H) are updated to the same value. However, during transmission, some RLC PDUs may be delayed or lost and thus missing. Because RLC PDUs having an SN higher than the missing RLC PDU are not delivered to the upper layer until the missing RLC PDUs are recovered, the variable VR(R) is used to hold the lowest SN of the missing RLC PDUs and thus maintain the receiving window until the missing RLC PDU is recovered. A more detailed explanation of these variables and their operation is provided below.

Referring to FIG. 4, frame (A) illustrates a time in which receipt of RLC PDUs is initiated. In accordance with their definition in Table 1, the variables VR(R) and VR(H) are both initially set to SN zero 405. Again the variable VR(R) denotes the value of the SN following the last in sequence completely received PDU and serves as the lower edge of the receiving window while the variable VR(H) denotes the value of the SN following the SN of the RLC PDU with the highest SN among received RLC PDUs. For convenience, the receiving window is not illustrated in any of the frames of FIG. 4.

In frame (B), an RLC PDU [0] 410 is received and input into the reception buffer. Accordingly, since the variable VR(R) holds the SN following the last in-sequence RLC PDU received, the variable VR(R) is updated to SN [1] 415. Similarly, the variable VR(H), which holds the value of the SN following the SN of the RLC PDU with the highest SN among received RLC PDUs, is also updated to SN [1] 415.

In frame (C), RLC PDU [1] 415 and RLC PDU [2] 420 have been received in sequence. Accordingly, both the variable VR(R) and the variable VR(H) are updated to SN [3] 425.

If the RLC PDUs are not received in sequence, for example if an RLC PDU is received having an SN higher than [x] when the variable VR(R)=[x], the RLC receiving entity detects that an RLC PDU is missing. For example, as illustrated in frame (D), if RLC PDU [4] is received and input into the buffer, the RLC receiving entity updates the variables VR(R) and VR(H) accordingly. Since the last in-sequence RLC PDU is RLC PDU [2] in spite of receipt of RLC PDU [4], the variable VR(R) is maintained at SN [3] 425. Also, with the receipt of RLC PDU [4] the highest SN of the received PDUs is now [4] such that the variable VR(H) is updated to SN [5] 435. Because the variable VR(H) is greater than the variable VR(R), the RLC receiving entity determines that at least one RLC PDU is missing. In this situation, and as will be explained in more detail below, the RLC receiving entity sets the variable VR(X) to the value of the variable VR(H) and starts the t_Reordering timer. For instance, if RLC PDU [4] 430 is received when both the variables VR(R) and VR(H) are set to [3] as in frame (C), the variable VR(H) is updated to [5], the t_Reordering timer is triggered, and the variable VR(X) is set to [5] which equals the SN held by the variable VR(H) as in frame (D).

In an LTE wireless communication system, a Hybrid Automatic Repeat reQuest (HARQ) process operates for all logical channels except for a few special cases. Accordingly, the missing RLC PDU may initiate the ARQ retransmission process. However, in order to determine whether the missing RLC PDU is successfully received using the HARQ process, the RLC receiving entity must wait until the HARQ process ends before request retransmission of the missing RLC PDU. Since it is impossible for the RLC receiving entity to determine the current RLC PDU while the HARQ process is executing, the ARQ process for an RLC PDU is not immediately initiated upon determination that an RLC PDU is missing. Rather, upon determination that an RLC PDU is missing, a timer is started to allow for receipt of an RLC PDU that may still be undergoing the receiving process. That is, if a missing RLC PDU is detected, then the RLC receiving entity starts the t_Reordering timer. If the missing RLC PDU is not received before the timer expires, the RLC receiving entity determines that the missing RLC PDU is a reception-failed RLC PDU and takes an appropriate action such as requesting retransmission of the reception-failed RLC PDU from the RLC transmitting entity.

The fact that the t_Reordering timer is operating indicates that the RLC receiving entity is in the middle of determining whether it fails to receive a missing RLC PDU. Upon expiration of the t_Reordering timer, the RLC receiving entity determines if the missing RLC PDU has been received. In assessing receipt of the missing RLC PDU after expiration of the t_Reordering timer, reference is made to the SN of the missing RLC PDU. The t_Reordering state variable, VR(X), is used for this purpose. The variable VR(X) holds the value of the SN following that of the RLC PDU which triggered the t_Reordering timer, i.e. the SN of the variable VR(H) at the time point when the t_Reordering timer is triggered. Accordingly, any RLC PDU that is still missing and has an SN lower than the value of the variable VR(X) at the time when the t_Reordering timer expires is determined as a reception-failed RLC PDU and may be requested for retransmission using an appropriate ARQ procedure.

While the t_Reordering timer is running, other missing RLC PDUs having an SN higher than that of the variable VR(X) may be detected. In this case, it may be considered that another t_Reordering timer should be triggered. However, in the LTE wireless communication system, the RLC receiving entity does not trigger a second t_Reordering timer when a first t_Reordering timer in running. This is to reduce the number of the timers running simultaneously. Rather, if the currently running t_Reordering timer stops or expires, then the RLC receiving entity again triggers the t_Reordering timer as a result of the other missing RLC PDU.

As the LTE wireless communication system evolves, data may be transmitted and received using multiple carriers. That is, in earlier LTE systems, only one MAC PDU is transmitted/received during one Transmission Time Interval (TTI). However, in LTE-Advanced (LTE-A), data may be transmitted and received using multiple carriers. In this case, an RLC receiving entity may receive a plurality of MAC PDUs during one TTI in which case an RLC layer would receive a plurality of RLC PDUs at one time so that a plurality of RLC PDUs may be missing.

Referring to FIG. 5, a conventional RLC receiving entity may receive multiple RLC PDUs simultaneously such that there may be multiple RLC PDUs missing. For example, as illustrated in frame (A) of FIG. 5, at the initiation of an RLC PDU receipt process, both the variables VR(R) and VR(H) are initialized to SN [0]. Between frame (A) and frame (B), the RLC receiving entity receives a plurality of RLC PDUs. Specifically, RLC PDU [0], RLC PDU [1], RLC PDU [3], RLC PDU [4], RLC PDU [5], and RLC PDU [7] arrive at the RLC receiving entity simultaneously while RLC PDU [2] and RLC PDU [6] are missing. Using the above described procedure, the RLC receiving entity inspects the RLC PDUs to detect missing RLC PDUs starting with the RLC PDU having the lowest SN. Accordingly, when receipt of RLC PDU [3] is identified, the RLC receiving entity detects that RLC PDU [2] is missing, starts a t_Reordering timer, and sets the variable VR(X) equal to the value of the variable VR(H) 515, which is [4] at that time. While inspecting the other received RLC PDUs, the RLC receiving entity updates the values of the state variables. In this case, the value of the variable VR(H) and the value of the variable VR(R) are respectively updated to SN [8] 520 and SN [2] 510 at the time when the remaining RLC PDUs are inspected.

As earlier mentioned, when multiple missing RLC PDUs are detected among simultaneously received multiple RLC PDUs, the RLC receiving entity operating in accordance with the above described method starts the t_Reordering timer for the missing RLC PDU having the lowest SN, i.e. RLC PDU [2], among the missing RLC PDUs. Accordingly, when it is determined, after the t_Reordering timer expires, that all the missing RLC PDUs are lost in consideration of the HARQ process, another t_Reordering timer is triggered for other missing RLC PDUs, e.g. missing RLC PDU [6]. Accordingly, in the illustrated example, the t_Reordering timer is initiated twice to determine whether the remaining missing RLC PDUs are in fact lost and thus should be requested for retransmission in the HARQ process.

First Exemplary Embodiment

In a first exemplary embodiment described below with reference to FIG. 6, when multiple missing RLC PDUs are detected from the RLC PDUs that are simultaneously transmitted, the RLC receiving entity does not start the t_Reordering timer until the missing RLC PDU having the highest SN is determined. That is, by setting the variable VR(X) to the SN held by the variable VR(H) at the time when the missing RLC PDU having the highest SN rather than the missing RLC PDU having the lowest SN is identified, the RLC receiving entity can determine that the missing RLC PDUs having SNs lower than that of the variable VR(X) are reception-failed PDUs. Referring again to the situation depicted in FIG. 5, since the SN of RLC PDU [6] 525 is the highest SN among the missing RLC PDUs, the variable VR(X) is set to [8] (i.e. the variable VR(X) is set to the variable VR(H)) at which time RLC PDU [6] is detected as the missing RLC PDU.

In the first exemplary embodiment of the present invention, the RLC receiving entity inspects the SNs of all RLC PDUs simultaneously received and updates the variable VR(H) to the SN following the SN of the highest RLC PDU received. If at least one RLC PDU is detected as missing after completing the inspection of the SNs, then the RLC receiving entity starts the t_Reordering timer and sets the variable VR(X) equal to the SN held by the variable VR(H).

Figure 6:
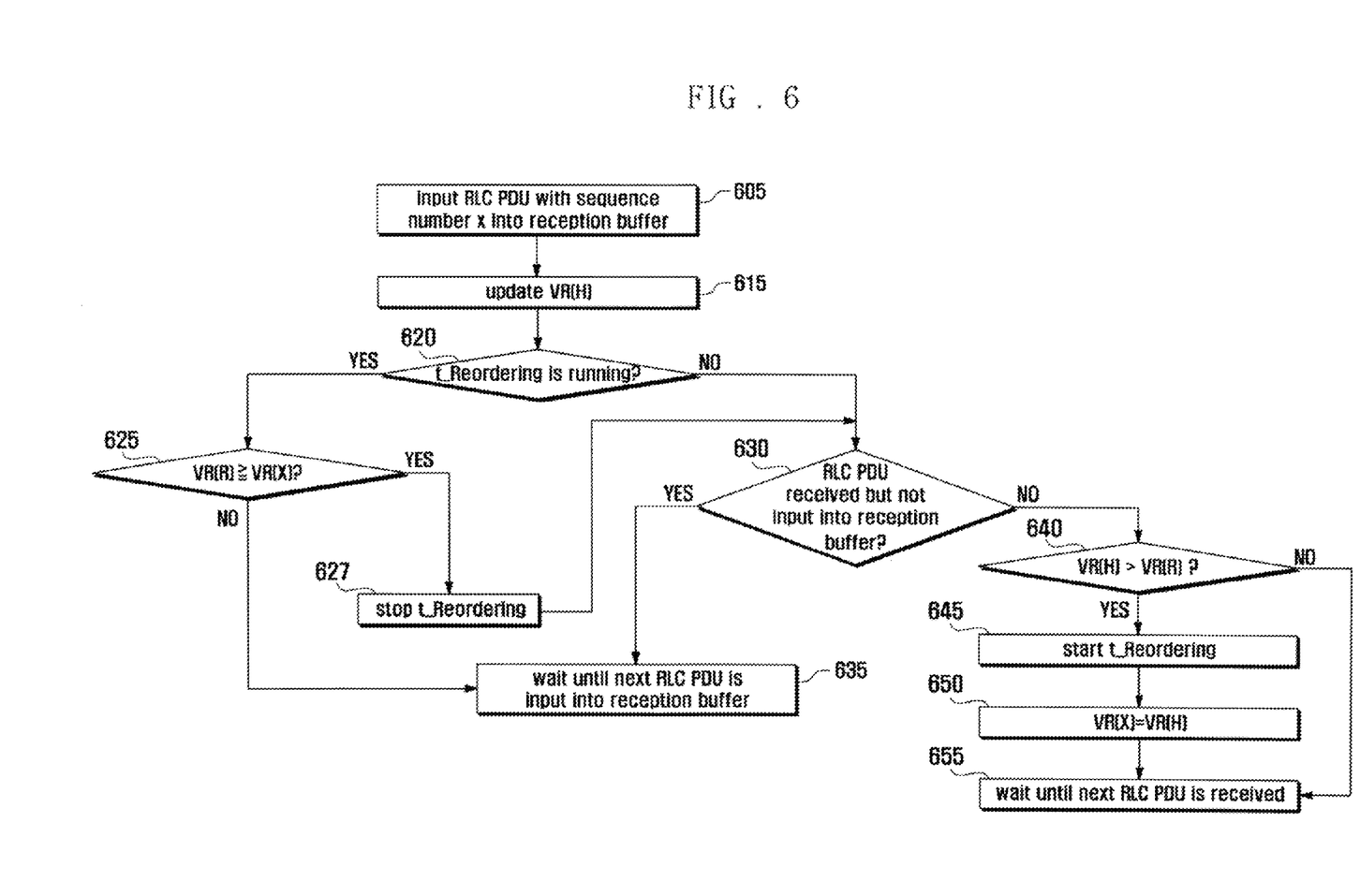
FIG. 6 is a flowchart illustrating a packet handling method according to a first exemplary embodiment of the present invention.

FIG. 6 is a flowchart illustrating a packet handling method according to the first exemplary embodiment of the present invention.

Referring to FIG. 6, an RLC PDU having SN [x] is input into a reception buffer in step 605. More particularly, an RLC receiving entity first inputs received RLC PDUs into a temporary reception buffer at which point it is determined if they should be forwarded to the reception buffer or discarded. After evaluation in the temporary receiving buffer, the RLC receiving entity forwards the RLC PDUs not to be discarded to the reception buffer in sequential order.

Upon input of the RLC PDU having SN [x] into the reception buffer, the RLC receiving entity updates the variable VR(H) in step 615. More particularly, when the SN [x] is greater than or equal to the current value of the variable VR(H), the RLC receiving entity updates the variable VR(H) to a value obtained by adding 1 to the value of the SN [x]. In step 620, it is determined if the t_Reordering timer is running. If it is determined that the t_Reordering timer is running in step 620, the RLC receiving entity determines if the variable VR(R) is greater than or equal to the variable VR(X) in step 625. If it is determined that the variable VR(R) is greater than or equal to the variable VR(X) in step 625, this indicates that there are no missing RLC PDUs, such that the RLC receiving entity stops the t_Reordering timer in step 627 and proceeds to step 630.

On the other hand, if it is determined in step 625 that the variable VR(R) is less than the variable VR(X), the RLC receiving entity proceeds to step 635 and waits until the next RLC PDU is input into the reception buffer. After step 635, the RLC receiving entity may return to step 605 and repeat the subsequent steps.

Referring again to step 620, if it is determined that the t_Reordering timer is not running, the RLC receiving entity proceeds to step 630 where it determines whether there is at least one RLC PDU that is received but not discarded and not yet input into the reception buffer. This condition may occur in a situation wherein multiple RLC PDUs are received simultaneously and input into the temporary reception buffer, but RLC PDUs with higher SNs, which are not to be discarded, are not yet input into the reception buffer. If the condition does occur, in other words if multiple PDUs are received and the RLC PDU in the middle of the current process is not the RLC PDU having the highest SN, the RLC receiving entity proceeds to step 635 and waits until the next PDU is input into the reception buffer. Otherwise, if the condition is not satisfied at step 630, that is, if the RLC PDU input into the reception buffer at step 605 is the RLC PDU having the highest SN in the reception buffer among the multiple RLC PDUs received simultaneously, the RLC receiving entity determines whether the variable VR(H) is greater than the variable VR(R) in step 640. If it is determined that the variable VR(H) is greater than the variable VR(R), this indicates that at least one RLC PDU is missing such that the RLC receiving entity starts the t_Reordering timer in step 645 and updates the variable VR(X) by setting it equal to the variable VR(H) in step 650. Finally, the RLC receiving entity waits until the next RLC PDU is received in step 655. On the other hand, if it is determined in step 640 that the variable VR(H) is not greater than the variable VR(R), this indicates that there are no missing RLC PDUs, such that the RLC receiving entity proceeds directly to step 655 and waits until the next RLC PDU is received.

Second Exemplary Embodiment

In a second exemplary embodiment of the present invention, the RLC receiving entity starts the t_Reordering timer upon detection of a missing RLC PDU similar to the method described above with reference to FIGS. 3-5. However, when another missing RLC PDU is detected while the t_Reordering timer is running and the t_Reordering timer has started recently, the RLC receiving entity restarts the t_Reordering timer and sets the variable VR(X) to a value equal to the SN held by the variable VR(H) updated at the time when the new missing RLC PDU is detected.

Figure 7:
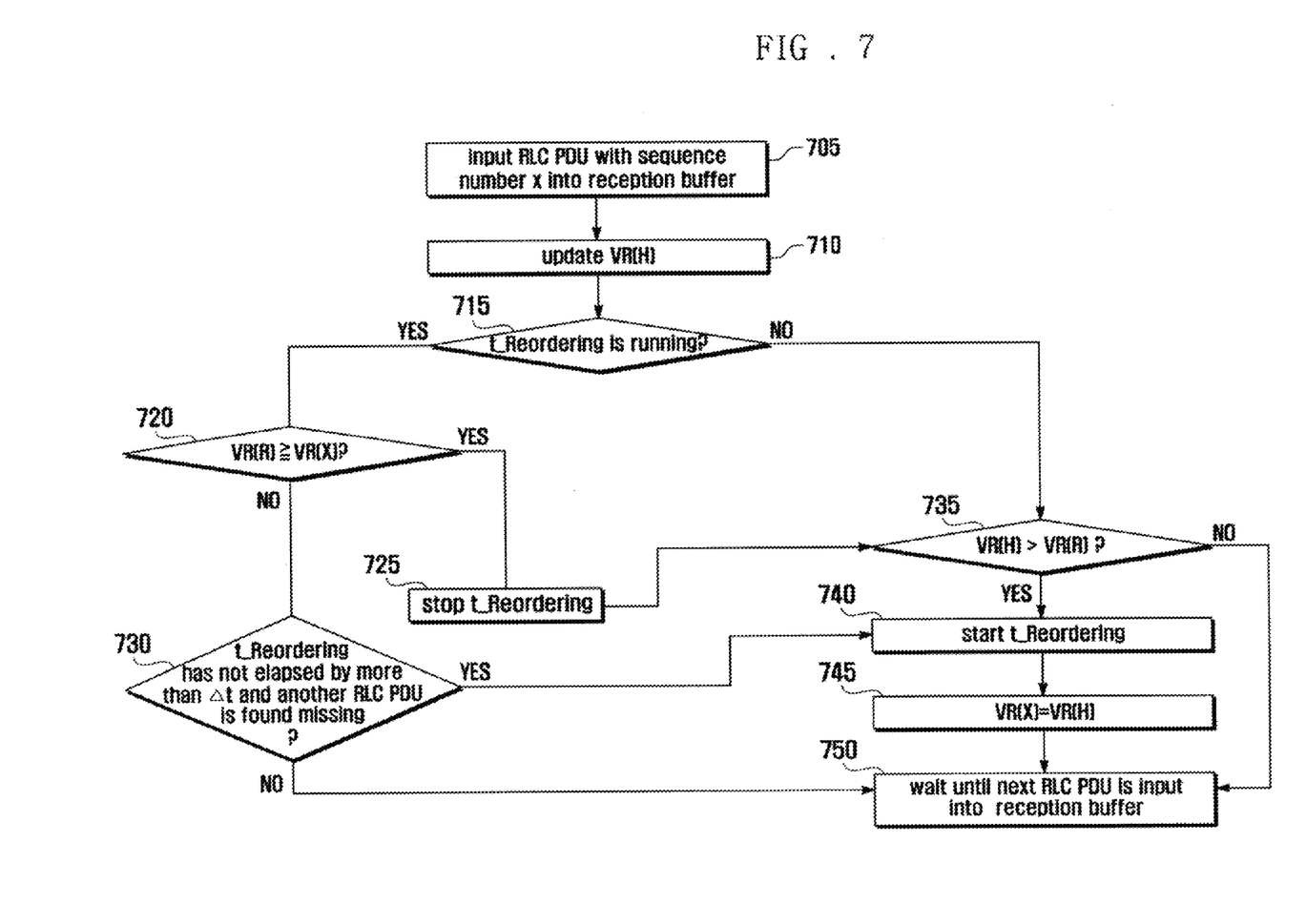
FIG. 7 is a flowchart illustrating a packet handling method according to a second exemplary embodiment of the present invention.

FIG. 7 is a flowchart illustrating a packet handling method according to the second exemplary embodiment of the present invention.

Referring to FIG. 7, an RLC PDU having an SN [x] is input into a reception buffer in step 705. Once the RLC PDU is input into the reception buffer, the RLC receiving entity updates the variable VR(H) in step 710. That is, when the SN [x] is greater than or equal to the variable VR(H), the RLC receiving entity updates the variable VR(H) to a value obtained by adding 1 to the SN [x]. In step 715, the RLC receiving entity determines whether the t_Reordering timer is running. If it is determined in step 715 that the t_Reordering timer is running, the RLC receiving entity proceeds to step 720 where it compares the variable VR(R) and the variable VR(X) to determine whether the variable VR(R) is greater than or equal to the variable VR(X). If it is determined that the variable VR(R) is greater than or equal to the variable VR(X), this indicates that there is no missing RLC PDU such that the RLC receiving entity stops the t_Reordering timer in step 725. After stopping the t_Reordering timer, the RLC receiving entity proceeds to step 735.

On the other hand, if it is determined in step 720 that the variable VR(R) is less than the variable VR(X), the RLC receiving entity determines in step 730 whether a time period greater than $\Delta t$ has elapsed since the start of the t_Reordering timer and whether another RLC PDU is found missing. Step 730 is performed such that the t_Reordering timer is triggered by the missing RLC PDU having the highest SN and the variable VR(X) is set to the value following the highest SN when multiple RLC PDUs are received simultaneously or in a short duration. If the condition of step 730 is satisfied, that is, if the time has not elapsed by more than the time period Δt from the start of the t_Reordering timer and another RLC PDU is found missing, this indicates that the t_Reordering timer should restart for another missing RLC PDU, such that the process proceeds to step 740. Otherwise, if the condition of step 730 is not satisfied, that is, the time has elapsed by more than the time period Δt from the start of the t_Reordering timer or no other RLC PDU is found missing, the RLC receiving entity waits until the next RLC PDU is input into the reception buffer in step 750. After step 750, the RLC receiving entity may return to step 705 and repeat the subsequent steps.

Referring again to step 715, if it is determined that the t_Reordering timer is not running, the RLC receiving entity determines whether the variable VR(H) is greater than the variable VR(R) in step 735.

If it is determined that the variable VR(H) is greater than the variable VR(R) in step 735, this indicates that there is at least one missing RLC PDU such that the RLC receiving entity starts the t_Reordering timer in step 740 and updates the variable VR(X) to a value equal to the SN held by the variable VR(H) in step 745. After updating the variable VR(X), the RLC receiving entity proceeds to step 750 where it waits until the next RLC PDU is input into the reception buffer. On the other hand, if it is determined in step 735 that the variable VR(H) is not greater than the variable VR(R), the RLC receiving entity proceeds to step 750 where it waits until the next RLC PDU is input into the reception buffer.

In an exemplary implementation, the time period Δt corresponds to the time required for inspecting the SNs of the received RLC PDUs and updating the variables such as VR(R) and VR(H) so that the time period Δt may be set to a small value. Alternatively, the time period Δt may be set to a value determined by the user equipment in the call establishment process or be a fixed value specified in a standard.

Third Exemplary Embodiment

A third exemplary embodiment of the present invention is similar to the second exemplary embodiment in that the RLC receiving entity starts a t_Reordering timer upon detection of a missing RLC PDU and, if another missing RLC PDU is detected, determines if a time period Δt has elapsed between detections. However, when another missing RLC PDU is detected while the t_Reordering timer is running and the t_Reordering timer has started recently, the RLC receiving entity allows the timer to continue running and sets the variable VR(X) to a value equal to the SN held by the variable VR(H) updated at the time when the other missing RLC PDU is detected. Accordingly, the first start of the timer may be used for detecting all missing RLC PDUs for all received RLC PDUs.

Figure 8:
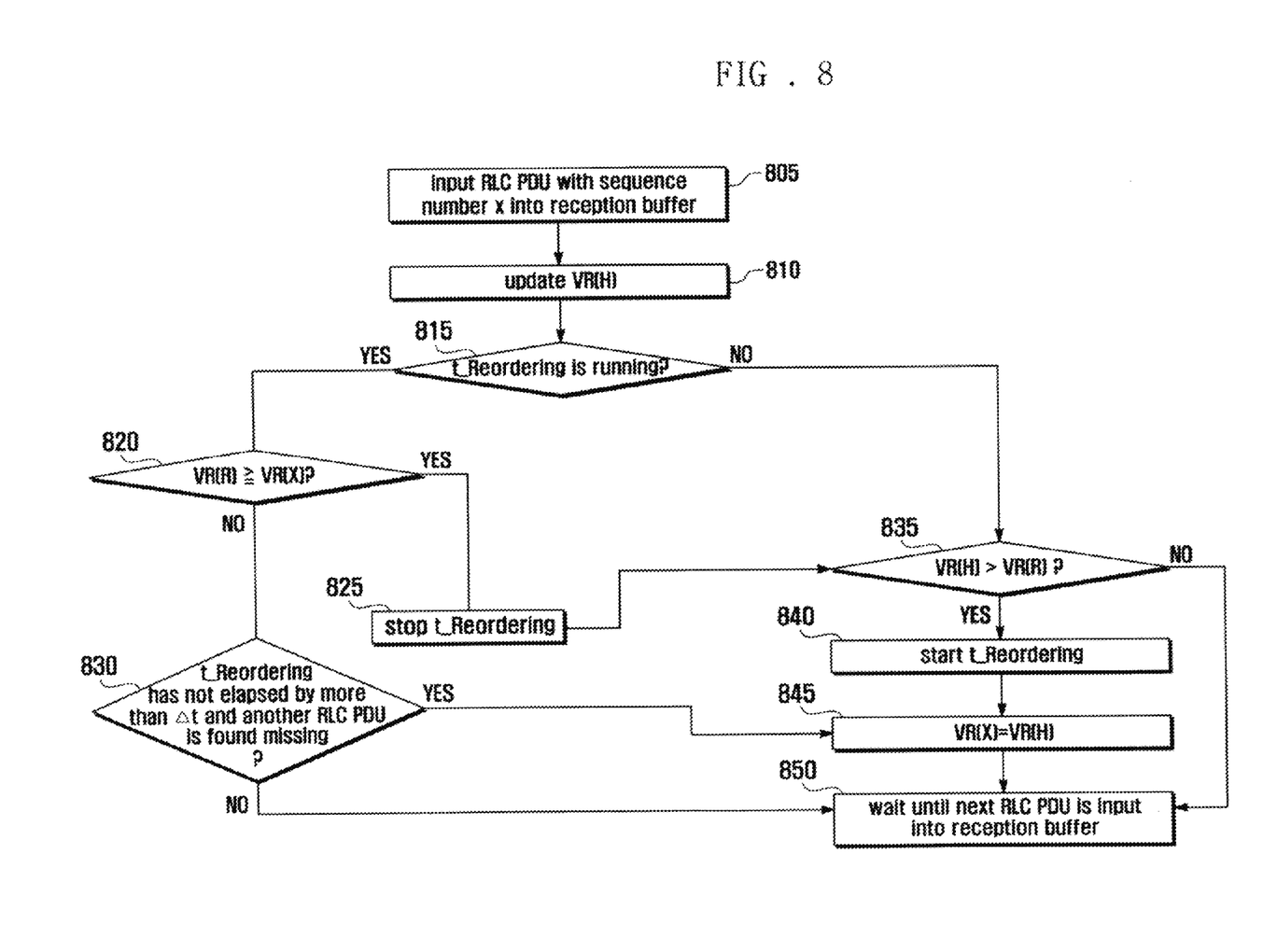
FIG. 8 is a flowchart illustrating a packet handling method according to a third exemplary embodiment of the present invention.

FIG. 8 is a flowchart illustrating a packet handling method according to the third exemplary embodiment of the present invention.

Referring to FIG. 8, an RLC PDU with SN [x] is input into a reception buffer in step 805. Once the RLC PDU is input into the reception buffer, the RLC receiving entity updates the variable VR(H) in step 810. That is, when the SN [x] is equal to or greater than the variable VR(H), the RLC receiving entity updates the variable VR(H) to a value obtained by adding 1 to the value of the SN [x]. In step 815, the RLC receiving entity determines whether the t_Reordering timer is running. If it is determined that the t_Reordering timer is running, the RLC receiving entity proceeds to step 820 where it compares the variable VR(R) and the variable VR(X) to determine whether the variable VR(R) is greater than or equal to the variable VR(X). If it is determined that the variable VR(R) is greater than or equal to the variable VR(X), this indicates that there is no missing RLC PDU, such that the RLC receiving entity stops the t_Reordering timer in step 825 and proceeds to step 835.

On the other hand, if it is determined in step 820 that the variable VR(R) is less than the variable VR(X), the RLC receiving entity determines whether a time period greater than Δt has elapsed from the start of the t_Reordering timer and whether another RLC PDU is found missing in step 830. Step 830 is performed such that the t_Reordering timer is triggered by the missing RLC PDU having the highest SN and the variable VR(X) is set to the value following the highest SN when multiple RLC PDUs are received simultaneously or in a short duration. If the condition of step 830 is satisfied, that is, if the time has not elapsed by more than the time period Δt from the start of the t_Reordering timer and another RLC PDU is found missing, this indicates that the variable VR(X) should be updated, such that the process proceeds to step 845. Otherwise, if the condition of step 830 is not satisfied, that is, the time has elapsed by more than the time period Δt from the start of the t_Reordering timer or no other RLC PDU is found missing, the RLC receiving entity proceeds to step 850 where it waits until the next RLC PDU is input into the reception buffer.

Referring again to step 815, if it is determined that the t_Reordering timer running, the RLC receiving entity determines whether the variable VR(H) is greater than the variable VR(R) in step 835.

If it is determined that the variable VR(H) is greater than the variable VR(R) in step 835, this indicates that there is at least one missing RLC PDU, such that the RLC receiving entity starts the t_Reordering timer in step 840 and updates the variable VR(X) to a value equal to the SN held by the variable VR(H) in step 845. After updating the variable VR(X), the RLC receiving entity waits until the next RLC PDU is input into the reception buffer in step 850 at which time it may return to step 805 and repeat the subsequent steps. On the other hand, if it is determined in step 835 that the variable VR(H) is not greater than the variable VR(R), the RLC receiving entity proceeds to step 850 where it waits until the next RLC PDU is input into the reception buffer.

In an exemplary implementation, the time period Δt corresponds to the time required for inspecting the SNs of the received RLC PDUs and updating the variables such as VR(R) and VR(H) so that the time period Δt may be set to a small value. Alternatively, the time period Δt can be set to a value determined by the user equipment in the call establishment process or be a fixed value specified in a standard.

Figure 9:
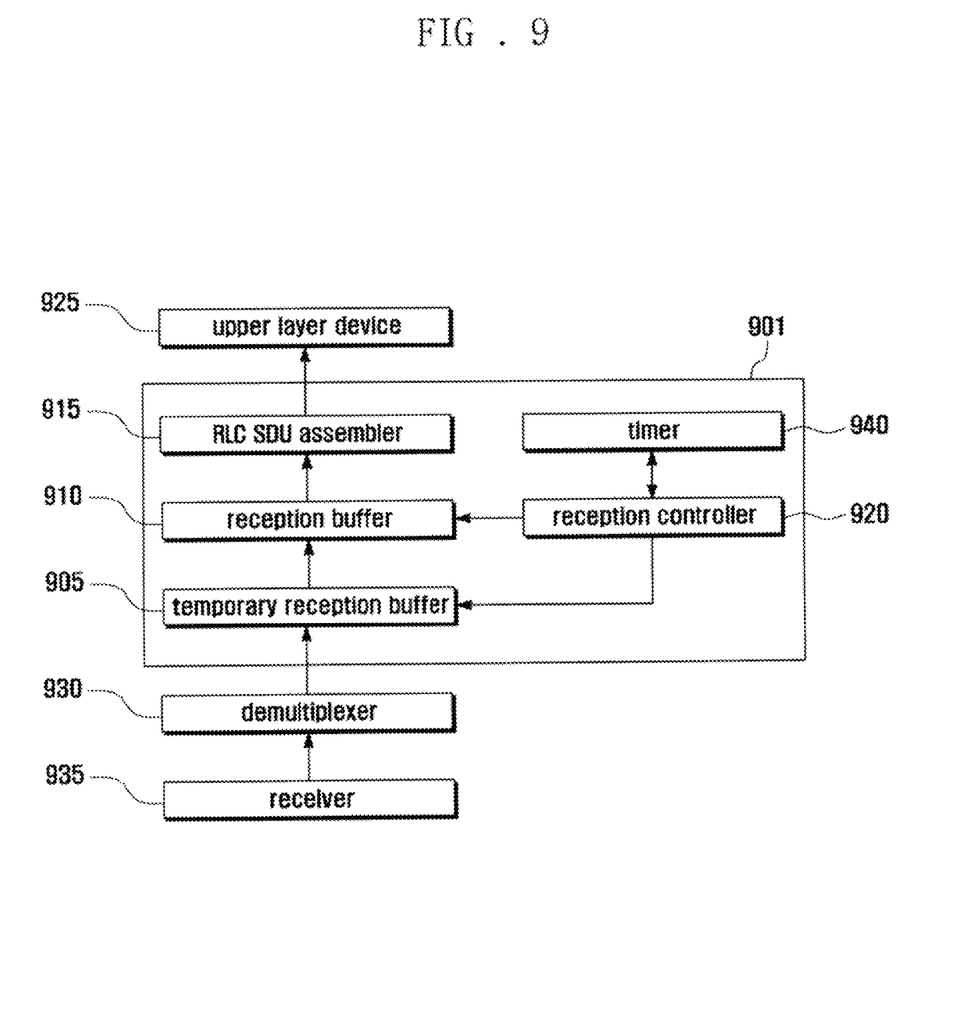
FIG. 9 is a block diagram illustrating a configuration of a packet handling device for a wireless communication system according to an exemplary embodiment of the present invention.

FIG. 9 is a block diagram illustrating a configuration of a packet handling device for a wireless communication system according to an exemplary embodiment of the present invention.

Referring to FIG. 9, the packet handling device includes an RLC receiving device 901, an upper layer device 925, a demultiplexer 930, and a receiver 935.

The RLC receiving device 901 includes a temporary reception buffer 905, a reception buffer 910, an RLC SDU assembler 915, and a reception controller 920. The temporary reception buffer 905 is connected to the demultiplexer 930 of a lower layer and temporarily stores RLC PDUs received from the lower layer. By temporarily storing the RLC PDUs received from the lower layer in the temporary reception buffer 905, it can be determined whether to input the RLC PDUs into the reception buffer 910 or have them discarded.

The reception controller 920 manages state variables including the variables VR(R), VR(H), VR(X), and VR(MR) and controls the start, stop, and restart of a t_Reordering timer 940. The reception controller 920 inspects the SNs of the RLC PDUs stored in the temporary buffer 905 and inputs the RLC PDUs into the reception buffer 910 in sequence from the RLC PDU having the lowest SN. If the SN of an RLC PDU is lower than the SN held by the variable VR(R) or greater than the variable VR(MR), the RLC PDU falls outside of the reception window. In this case, the reception controller 920 discards the RLC PDU rather than inputting it into the reception buffer.

The reception buffer 910 stores the RLC PDUs arranged in sequence within the reception window. The reception controller 920 updates the variable VR(H), if necessary, with reference to the SN of the new RLC PDU input into the reception buffer 910. The reception controller 920 starts the t_Reordering timer 940 and updates the variable VR(X) as described in the first to third exemplary embodiments of the present invention. The RLC PDUs satisfying specific conditions are delivered to the RLC SDU assembler 915, and the reception controller 920 updates the variable VR(R) with reference to the SNs of the RLC PDUs delivered to the RLC SDU assembler 915. The RLC PDUs satisfying the specific conditions can be the RLC PDUs arranged in sequence.

The RLC SDU assembler 915 reassembles the RLC PDUs into RLC SDUs with reference to the header information of the RLC PDUs and delivers the RLC SDUs to the upper layer device 925. The upper layer device 925 can be a PDCP device which processes the RLC SDUs and performs appropriate operations with the RLC SDUs.

The receiver 935 converts a radio signal received through a radio channel into a bit stream and delivers the bit stream to the demultiplexer 930. The demultiplexer 930 demultiplexes the bit stream, i.e. MAC PDUs, received from the receiver into RLC PDUs and delivers the RLC PDUs to the RLC receiving device.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for receiving a plurality of Protocol Data Units (PDUs) in a wireless communication device, the method comprising:
    receiving a plurality of PDUs;
    inputting one of the plurality of PDUs into a reception buffer;
    starting a timer if a PDU is determined missing in the reception buffer; and
    updating a first variable based on a Sequence Number (SN) of the PDU input into the reception buffer,
    wherein the first variable indicates the highest SN of PDUs input into the reception buffer,
    wherein the timer is run once for all missing PDUs,
    wherein a PDU is determined missing in the reception buffer if the first variable is greater than a second variable, and
    wherein the second variable indicates the SN following the last in sequence PDU input into the reception buffer.

2. The method of claim 1, further comprising:
    if the PDU is determined missing in the reception buffer, setting a third variable equal to the first variable and waiting for a next PDU to be input into the reception buffer, wherein the third variable indicates the SN following the SN of a PDU that triggered the timer.

3. The method of claim 2, further comprising:
    if the timer is running and the second variable is not greater than or equal to the third variable,
    setting the third variable equal to the first variable if the time period $\Delta t$ has not elapsed and another PDU is determined missing; and
    if the timer is running and the second variable is greater than or equal to the third variable, stopping the timer.

4. The method of claim 1, further comprising:
    checking whether the PDU determined to be missing is received while the timer is running; and
    stopping the timer if the missing PDU is received, or incrementing a missing PDU count if a time period $\Delta t$ has not elapsed and another PDU is determined missing.

5. The method of claim 4, wherein the value of $\Delta t$ comprises at least one of a time for inspecting the SNs of the received PDUs and updating the first and second variables, a value determined during a call establishment process and a value specified in a standard.

6. The method of claim 1, wherein the starting of the timer is deferred until all the received PDUs are input into the reception buffer.

7. The method of claim 6, further comprising:
    updating a first variable based on an SN of the PDU input into the reception buffer, wherein the first variable indicates the highest SN of PDUs input into the reception buffer,
    wherein a PDU is missing in the reception buffer if the first variable is greater than a second variable, wherein the second variable indicates the SN following the last in sequence PDU input into the reception buffer.

8. The method of claim 7, further comprising:
    if the PDU is determined missing in the reception buffer, setting a third variable equal to the first variable and waiting for a next PDU to be input into the reception buffer, wherein the third variable indicates the SN following the SN of a PDU that triggered the timer.

9. The method of claim 8, further comprising:
    if the timer is running and the second variable is greater than or equal to the third variable, stopping the timer; and
    if the timer is running and the second variable is not greater than or equal to the third variable, waiting for a next PDU to be input into the reception buffer.

10. The method of claim 6, further comprising:
    checking whether the PDU determined to be missing is received while the timer is running; and
    stopping the timer if the missing PDU is received, or waiting for a next PDU to be input into the reception buffer.

11. The method of claim 1, wherein the plurality of PDUs comprise Radio Link Control (RLC) PDUs and the receiving of the plurality of PDUs comprises receiving the RLC PDUs from a Media Access Control (MAC) layer.

12. The method of claim 1, wherein the PDU is determined missing in the reception buffer based on a first variable and a second variable,
    wherein the first variable indicates the highest SN of PDUs input into the reception buffer and the second variable indicates the SN following the last in sequence PDU input into the reception buffer.

13. A method for receiving a plurality of Protocol Data Units (PDUs) in a wireless communication device, the method comprising:

receiving a plurality of PDUs;
inputting one of the plurality of PDUs into a reception buffer;
starting a timer if a PDU is determined missing in the reception buffer; and
updating a first variable based on a Sequence Number (SN) of the PDU input into the reception buffer,
wherein the first variable indicates the highest SN of PDUs input into the reception buffer,
wherein the timer is run for all missing PDUs and is restarted if another PDU is determined missing while the timer is running,
wherein a PDU is determined missing in the reception buffer if the first variable is greater than a second variable, and
wherein the second variable indicates the SN following the last in sequence PDU input into the reception buffer.

14. The method of claim 13, further comprising:
if the PDU is determined missing in the reception buffer, setting a third variable equal to the first variable and waiting for a next PDU to be input into the reception buffer, wherein the third variable indicates the SN following the SN of a PDU that triggered the timer.

15. The method of claim 14, further comprising:
if the timer is running and the second variable is not greater than or equal to the third variable,
re-starting the timer if the time period Δt has not elapsed and another PDU is determined missing; and
if the timer is running and the second variable is greater than or equal to the third variable, stopping the timer.

16. The method of claim 13, further comprising:
checking whether the PDU determined to be missing is received while the timer is running; and
stopping the timer if the missing PDU is received, or
re-starting the timer if a time period Δt has not elapsed and another PDU is determined missing.

17. The method of claim 16, wherein the value of Δt comprises at least one of a time for inspecting the SNs of the received PDUs and updating the first and second variables, a value determined during a call establishment process and a value specified in a standard.

18. The method of claim 13, wherein the PDU is determined missing in the reception buffer based on a first variable and a second variable,
wherein the first variable indicates the highest SN of PDUs input into the reception buffer and the second variable indicates the SN following the last in sequence PDU input into the reception buffer.

19. An apparatus for receiving a plurality of Protocol Data Units (PDUs), the apparatus comprising:
a demultiplexer for demultiplexing a bit stream into a plurality of PDUs; and
a PDU receiving device for receiving the plurality of PDUs from the demultiplexer, for inputting one of the plurality of PDUs into a reception buffer, for starting a timer if a PDU is determined missing in the reception buffer, and for updating a first variable based on a Sequence Number (SN) of the PDU input into the reception buffer,
wherein the first variable indicates the highest SN of PDUs input into the reception buffer,
wherein the timer is run once for all missing PDUs,
wherein a PDU is determined missing in the reception buffer if the first variable is greater than a second variable, and
wherein the second variable indicates the SN following the last in sequence PDU input into the reception buffer.

20. The apparatus of claim 19, wherein the starting of the timer is deferred until all the received PDUs are input into the reception buffer.

21. The apparatus of claim 19, wherein the PDU is determined missing in the reception buffer based on a first variable and a second variable,
wherein the first variable indicates the highest SN of PDUs input into the reception buffer and the second variable indicates the SN following the last in sequence PDU input into the reception buffer.

22. An apparatus for receiving a plurality of Protocol Data Units (PDUs), the apparatus comprising:
a demultiplexer for demultiplexing a bit stream into a plurality of PDUs; and
a PDU receiving device for receiving the plurality of PDUs, for inputting one of the plurality of PDUs into a reception buffer, and for starting a timer if a PDU is determined missing in the reception buffer, and for updating a first variable based on a Sequence Number (SN) of the PDU input into the reception buffer,
wherein the first variable indicates the highest SN of PDUs input into the reception buffer,
wherein the timer is run for all missing PDUs and is restarted if another PDU is determined missing while the timer is running,
wherein a PDU is determined missing in the reception buffer if the first variable is greater than a second variable, and
wherein the second variable indicates the SN following the last in sequence PDU input into the reception buffer.

23. The apparatus of claim 22, wherein the PDU is determined missing in the reception buffer based on a first variable and a second variable,
wherein the first variable indicates the highest SN of PDUs input into the reception buffer and the second variable indicates the SN following the last in sequence PDU input into the reception buffer.

* * * * *